April 17, 1962 R. GENEVE 3,030,449
TRANSMISSION SYSTEM
Filed March 14, 1957

INVENTOR
RAOUL GENEVE
BY
Frank R. Jefani
AGENT

United States Patent Office 3,030,449

Patented Apr. 17, 1962

3,030,449

TRANSMISSION SYSTEM

Raoul Geneve, Le Perreux-sur-Marne, France, assignor to North American Philips Company, Inc., New York, N.Y., a corporation of Delaware Filed Mar. 14, 1957, Ser. No. 646,096
Claims priority, application France Mar. 14, 1956
2 Claims. (Cl. 179—15)

The present invention relates to transmission systems for electrical signals, more particularly television systems, in which simultaneously, independently of one another, two different signals are transmitted by means of the same carrier, which is adapted to be transmitted by radio frequency with the aid of a second carrier and in which, before the signals modulate, on the transmitter side, the first said carrier, correction signals are added to these signals to compensate, on the receiver side, cross-talk occurring at the reproduction of the signals; these correction signals are the same for the two signals and are proportional to the product of these two signals.

From the patent application Serial No. 460,750, filed October 6, 1954, now Patent Number 2,907,830, such a transmission system is known, in which a carrier is used for the transmission of the two said signals, which carrier has unequal half waves or half waves rendered unequal, and which has a suitable frequency, the positive half periods not being modulated by the first signal, but by a function of this signal to the instantaneous ratio between the two signals, whereas the negative half periods are not modulated by the second signal, but by a function thereof to the instantaneous ratio between the two signals, the carrier thus modulated modulating, in turn, for radio transmission in known manner, a carrier having a higher frequency. Thus a suitable correction of cross-talk for each of the respective signals is obtained. This correction may be fairly accurate, provided use is made of a comparatively complicated apparatus, which is the more complicated the more accurate should be the correction.

In order to simplify the apparatus a less accurate correction may suffice, but it will be appreciated that a satisfactory quality of the received television images requires a cross-talk correction which must be sufficient to avoid the unwanted distortions which would become observable.

The invention has for its object to improve the said transmission system so that it can suffice the various demands of practice and has particularly for its object to simplify the apparatus without unadmissible distortions at the receiver end.

The transmission system according to the invention has the feature that the correction signals are added, for the compensation of cross-talk occurring at the receiver end during the reproduction of the signals, to the two signals and that for these two signals the correction signals are the same and are proportional to the product of the two signals.

The invention will be described more fully with reference to the accompanying drawing, in which FIG. 1 shows a curve illustrating the influence of cross-talk in the known systems.

In accordance with the aforesaid patent, in order to correct the cross-talk, signals, which may be indicated by $f_1[1-D(f_2/f_1)]$ and $f_2[1-D(f_1/f_2)]$ may be transmitted instead of the original signals $f_1(t)$ and $f_2(t)$.

However, in order to obtain the correct correction signals $f_1D(f_2/f_1)$ and $f_2D(f_1/f_2)$, a comparatively complicated apparatus is involved. Efforts have therefore been made to realize simplified correction methods.

It may be assumed, for example, that $$D(f_2/f_1)=-\alpha f_2/f_1$$
$$D(f_1/f_2)=-\alpha f_1/f_2$$

wherein $\alpha$ designates a constant.

It has furthermore been stated that the cross-talk correction is rendered more effective, if the gamma correction of the image is carried out previously, so that the modulation signals of the two half periods are as follows:

$$\varphi_1=f_1^{1/\gamma}+\alpha f_2^{1/\gamma}$$
$$\varphi_2=f_2^{1/\gamma}+\alpha f_1^{1/\gamma}$$

This correction provided per se an improvement, but in practice it has been found that an improved method may be carried out without involving very complicated means. There will first be considered a transmission system without any cross-talk correction, it being assumed that the transmission circuit is linear. At the receiver end, by detection in two opposite directions along two different channels, the signals $$ij_1=f_1\left[1+D\left(\frac{f_2}{f_1}\right)\right]$$
$$ij_2=f_2\left[1+D\left(\frac{f_1}{f_2}\right)\right]$$

are obtained, i.e. the desired signals with the cross-talk components to be suppressed by the aforesaid correction method. Since cross-talk phenomena occur in symmetry, it suffices to examine the process in one of the channels.

Figure 1:
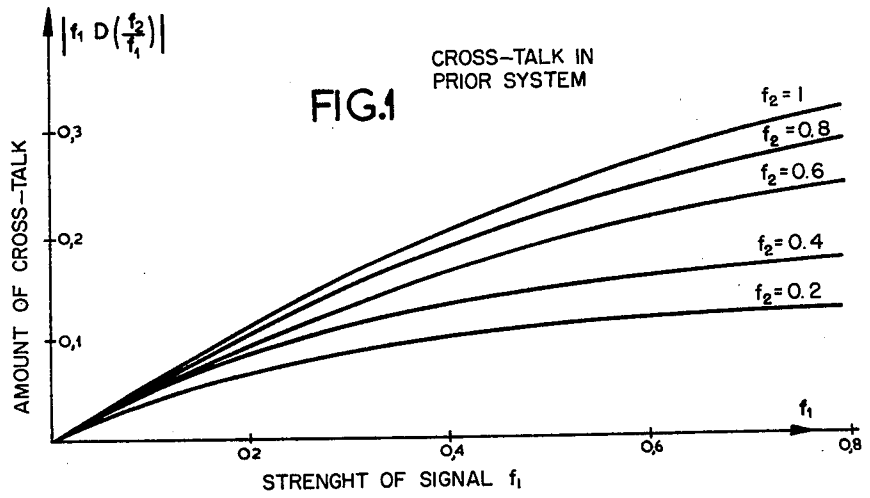

FIG. 1 shows a group of curves for different values of $f_2$ between 0 and 1 [$f_2=1$, $f_2=0.8$, $f_2=0.6$, $f_2=0.4$ and $f_2=0.2$] from which it appears to what extent the absolute value of the cross-talk component $f_1D(f_2/f_1)$ varies as a function of $f_1$. It is assumed in this case that the signals $f_1$ and $f_2$ vary between 0 and 1.

The approximation according to the invention, which appears to be quite sufficient in practice, consists in the adaptation of this curve to a bunch of straight lines having slopes which are proportional to $f_2$.

Then there are obtained:

$$f_1D\left(\frac{f_2}{f_1}\right)=-Kf_1f_2$$

$$f_2D\left(\frac{f_1}{f_2}\right)=-Kf_1f_2$$

wherein K designates a constant value.

Considering, as stated above, the gamma correction, the signals to be finally transmitted in accordance with the invention becomes as follows:

$$\varphi_1=f_1^{1/\gamma}+Kf_1^{1/\gamma}f_2^{1/\gamma}$$
$$\varphi_2=f_2^{1/\gamma}+Kf_1^{1/\gamma}f_2^{1/\gamma}$$

It should be noted that the correction value is, in this case, zero, if one of the two video signals is zero. In the same manner as in the completely corrected transmission the cross-talk is zero in the black portion of the image, it is also zero in the present case, which is a favourable property of the system. It is important to choose the coefficient K to be such that the remaining cross-talk component should be as low as possible.

In accordance with a preferred embodiment of the invention K has a value such that the cross-talk in the white portion of the image is also zero, i.e. at the maximum values of the two video signals. In practice this could be attained at a value of K of about 0.56, if no gamma correction were carried out. ($\gamma=1$). When gamma correction is carried out, K is a function of $\gamma$.

Figure 2:
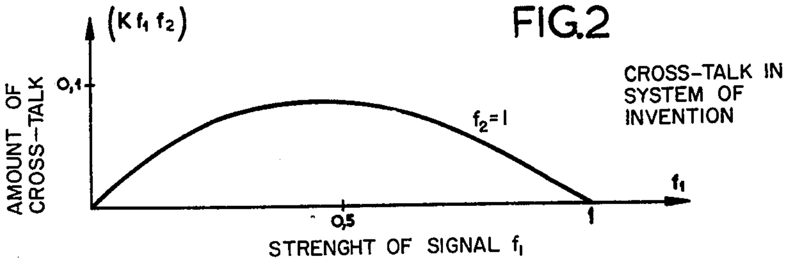
FIG. 2 shows a similar curve for a system according to the invention.

Under these conditions the curve illustrating the value of the cross-talk component of the channel 2 to the channel 1 as a function of the signal $f_1$, varies, at the maximum value (1) of the interference signal $f_2$, in a manner such that the course shown in FIG. 2 is obtained. The curve thus starts from 0 at $f_1=0$, reaches a maximum of about 0.08 ($\gamma$ is chosen to be 1) and returns to zero at $f_1=1$.

Figure 3:
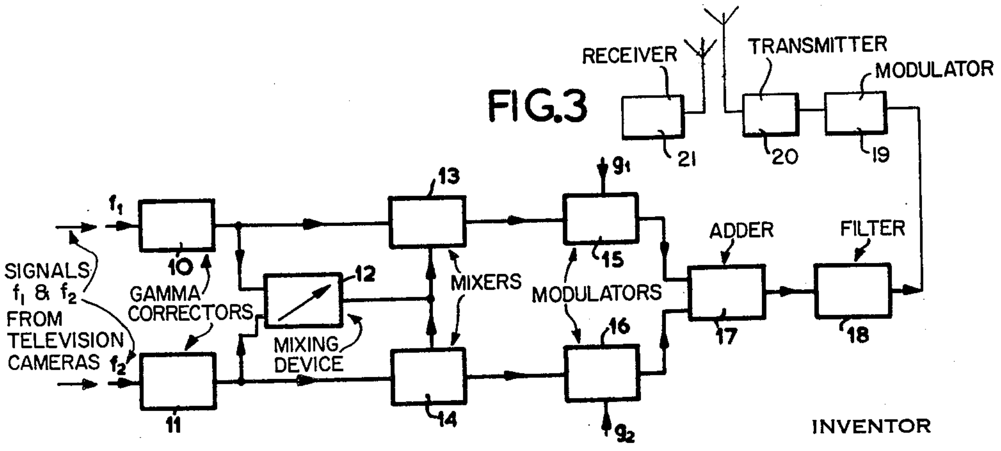
FIG. 3 shows an embodiment of a circuitry which may be employed in a system according to the invention.

By way of example FIG. 3 shows a device for carrying out the method according to the invention. The signals $f_1$ and $f_2$, originating from two television cameras picking up either different programs or two images of the same scenery to be transmitted, are first applied to two devices 10 and 11 respectively, which operate as gamma correctors. The signals $f_1^{1/\gamma}$ and $f_2^{1/\gamma}$ are applied to a mixing device 12, which may be constructed in known manner and which supplies the correction components and which is provided with control-means to adjust K to its optimum value. The mixing device 12 may be a modulator of which the output signal, which is proportional to the product of the two input signals, constitutes the correction components. These correction components are supplied to an input terminal of each of the mixers 13 and 14, to which are also supplied the output signals of the devices 10 and 11, so that at the output terminal, signals are obtainable, which correspond to the aforesaid signals $\varphi_1$ and $\varphi_2$. The latter signals are supplied to the modulators 15 and 16, in which they are modulated on the respective carriers in accordance with the aforesaid patent:

$$g_1(t)=1+2\cos\omega_0 t$$
$$g_2(t)=1-2\cos\omega_0 t$$

wherein $\omega_0$ designates the angular frequency of the carrier in the aforesaid sense. The modulation products are added in an additive device 17, then filtered by means of a filter 18, which limits the frequency band on the upper side before the signals are supplied to a modulator 19, in which they are modulated on the carrier to be finally transmitted by a transmitter 20 and received by a receiver

21. The circuits in each of the boxes shown in FIG. 3, are standard circuits which are well known to those skilled in the art, and hence they are not shown in detail. The invention lies in the interconnections among the various circuits, as shown in FIG. 3, rather than in the details of any individual circuits.

What is claimed is:

1. In a transmitter comprising means for modulating a carrier wave with two simultaneous signals, the improvement consisting of means for reducing cross-talk between said signals, said means for reducing cross-talk comprising a mixing device connected to mix said signals thereby to produce a correction signal which is proportional to the product of said two signals, and means connected to add said correction signal to each of said signals before said carrier wave is modulated therewith.

2. In a transmission system comprising means for modulating a carrier wave with two simultaneous signals and receiver means for reproducing said two signals, the improvement consisting of means for reducing cross-talk between said signals, said means for reducing cross-talk comprising a mixing device connected to mix said signals thereby to produce a correction signal which is proportional to the product of said two signals, and means connected to add said correction signal to each of said signals before said carrier wave is modulated therewith.

References Cited in the file of this patent

UNITED STATES PATENTS

| | | |
|---|---|---|
| 1,906,269 | Hough | May 2, 1933 |
| 2,212,808 | Cooley | Aug. 27, 1940 |
| 2,261,628 | Lovell | Nov. 4, 1941 |
| 2,681,384 | Guanella | June 15, 1954 |
| 2,907,830 | Boutry | Oct. 6, 1959 |